Figure 1:
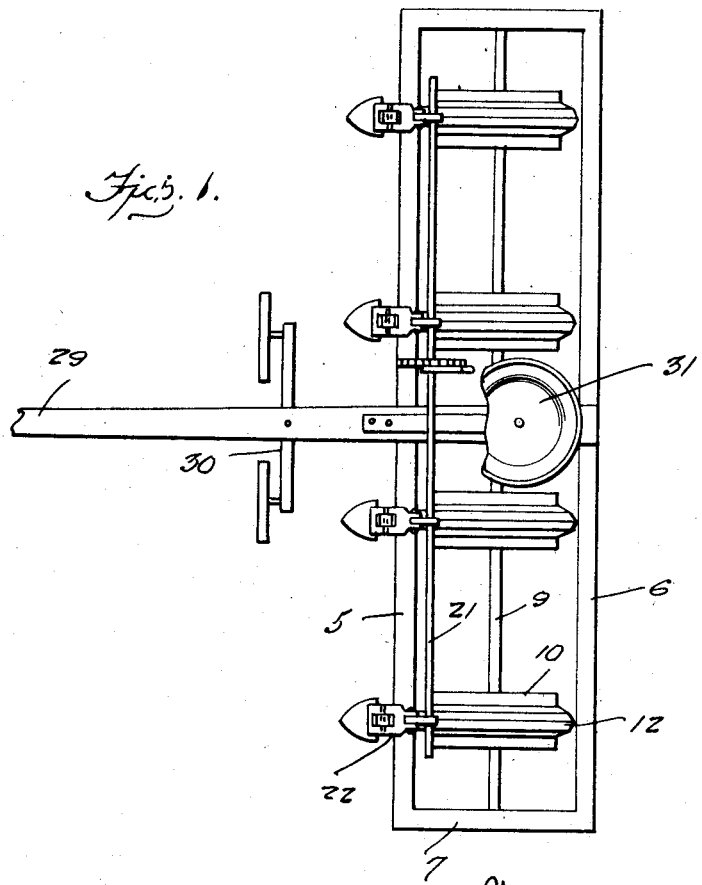

June 10, 1930. C. B. LINDBURG 1,763,166
ROTARY LAND CORRUGATOR
Filed May 15, 1928

Inventor
C. B. Lindburg

By Clarence A. O'Brien
Attorney

Patented June 10, 1930

1,763,166

UNITED STATES PATENT OFFICE

CECIL B. LINDBURG, OF DARLINGTON, IDAHO

ROTARY LAND CORRUGATOR

Application filed May 15, 1928. Serial No. 277,946.

The present invention relates to an apparatus for corrugating the ground incident to irrigation thereof and has for its prime object to provide a structure having a plurality of digging implements following by followers for shaping the shallow ditches formed by the digging elements.

Another very important object of the invention resides in the provision of an apparatus of this nature, with means whereby the digging depth of the digging implements may be conveniently controlled simultaneously.

A still further object of the invention resides in the provision of an apparatus of this nature which is exceedingly simple in its construction, strong and durable, inexpensive to manufacture, thoroughly efficient and reliable in its operation, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

Figure 2:
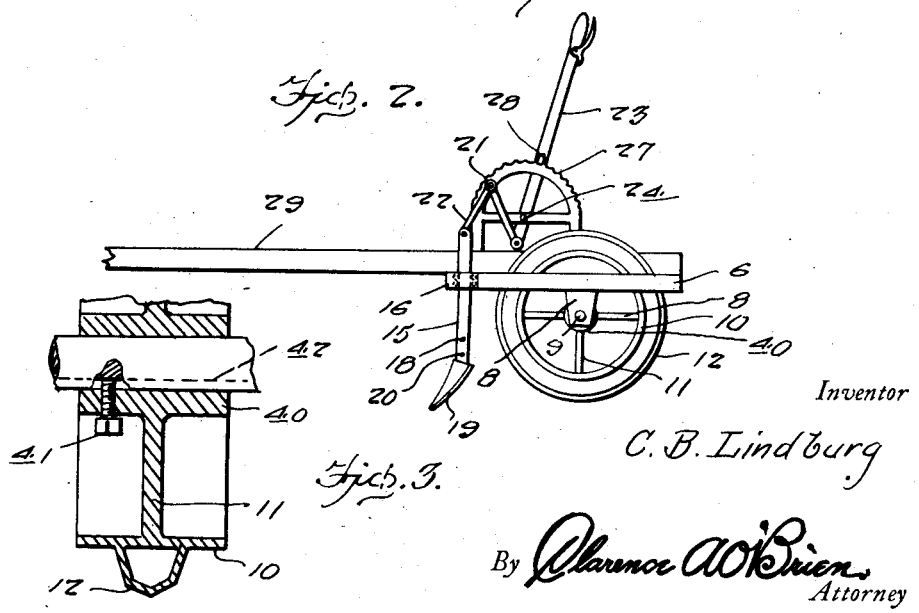
Figure 3:
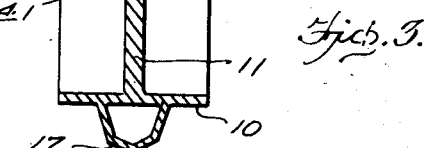

In the drawing:

Figure 1 is a top plan view of an apparatus embodying the features of my invention, Figure 2 is a side elevation thereof, and Figure 3 is a fragmentary section through one of the rollers.

Referring to the drawing in detail, it will be seen that I provide a rectangular frame comprising relatively long front and rear bars 5 and 6 respectively, connected by end bars 7. Brackets 8 depend from the side bars 7 and have journaled therein a shaft 9 on which are mounted rollers. Each roller comprises a rim 10, on the ends of spokes 11, and about the rim, at the center thereof, there is formed an annular rib 12, of substantially V-shaped formation in cross section and spaced inwardly from the side edges of the rim. The spokes radiate from hub 40 which has a set screw 41 engageable in the groove 42 of the shaft.

A plurality of looped guide brackets 16 extend forwardly from the front cross bar 5, one in front of each roller. Elongated shanks 15 are slidable through the brackets 16 and are disposed vertically and have a brake joint 18 with digging elements 19, which are held rigid with the shank by means of brake pins 20.

The upper ends of the shanks are connected together with a rod 21 by links 22. The rod is engaged with a lever 23, pivoted as at 24. A notched segment 27 is mounted on the frame so that a hand controlled detent structure 28 may be engaged therewith, whereby the bell crank lever may be held in different adjusted positions. A beam 29 is attached to the center of the frame, the forward portion forming a tongue and having attached thereto a double tree structure 30. A seat 31 is attached to the rear portion of the beam.

From the above detailed description, it will be seen that as the apparatus is pulled forwardly, the digging elements will form furrows in the ground, in which will ride the rollers for properly shaping the furrows and sufficiently packing the first, so that irrigation may be carried on in an effective and efficient manner. The depth of the furrows may be controlled by proper manipulation of the rising arm of the bell crank lever 23.

It is thought that the construction, operation and advantages of this invention will now be quite apparent to those skilled in this art, without a more detailed description thereof.

The present embodiment of the invention has been disclosed in detail, merely by way of example, since in actual practice, it attains the features of advantage enumerated as desirable in the statement of the invention and the above description.

It will be apparent that changes in the details of construction, and in the combination and arrangement of parts may be resorted to, without departing from the spirit or scope of the invention as hereinafter claimed or sacrificing any of its advantages.

Having thus described my invention, what I claim as new is:

An apparatus of the character described, comprising a frame, a shaft journaled across the frame, a plurality of rollers on the shaft in spaced relation to each other, each roller including a rim, a hollow rib encircling the rim comprising a pair of outwardly converging side walls disposed inwardly of the marginal edges of the rim and a substantially V-shaped end wall bridging the side walls at their outer edges, and a plurality of digging elements supported on the frame, one in front of each roller.

In testimony whereof I affix my signature.

CECIL B. LINDBURG.